(12) United States Patent
Kumarasubramanian et al.

(10) Patent No.: US 11,533,391 B2
(45) Date of Patent: Dec. 20, 2022

(54) STATE REPLICATION, ALLOCATION AND FAILOVER IN STREAM PROCESSING

(71) Applicant: Microsoft Technology Licensing, LLC, Redmond, WA (US)

(72) Inventors: Bharath Kumarasubramanian, Sunnyvale, CA (US); Jagadish Venkatraman, Sunnyvale, CA (US); Jacob R. Maes, San Jose, CA (US); Kartik Paramasivam, Sunnyvale, CA (US); Prateek Maheshwari, Sunnyvale, CA (US); Ray Manpreet Singh Matharu, Sunnyvale, CA (US); Samarth Shetty, Campbell, CA (US); Shanthoosh Pazhanjur Venkataraman, Mountain View, CA (US); Yi Pan, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 215 days.

(21) Appl. No.: 16/432,523

(22) Filed: Jun. 5, 2019

(65) Prior Publication Data
US 2020/0389546 A1 Dec. 10, 2020

(51) Int. Cl.
*H04L 65/61* (2022.01)
*H04L 69/40* (2022.01)
*H04L 65/80* (2022.01)

(52) U.S. Cl.
CPC .............. *H04L 69/40* (2013.01); *H04L 65/61* (2022.05); *H04L 65/80* (2013.01)

(58) Field of Classification Search
CPC ...... H04L 69/40; H04L 65/4069; H04L 65/80
See application file for complete search history.

(56) References Cited

U.S. PATENT DOCUMENTS

| | | | |
|---|---|---|---|
| 9,280,591 B1* | 3/2016 | Kharatishvili | ........... G06F 16/27 |
| 2003/0172074 A1* | 9/2003 | Highleyman | ....... G06F 11/2097 |
| 2008/0253283 A1* | 10/2008 | Douglis | .............. H04L 67/1095 |
| | | | 370/228 |
| 2014/0173052 A1* | 6/2014 | Newton | .............. H04L 41/0816 |
| | | | 709/219 |
| 2014/0304231 A1* | 10/2014 | Kamath | ................... G06F 16/27 |
| | | | 707/634 |
| 2016/0132262 A1* | 5/2016 | Dasari | ..................... G06F 16/23 |
| | | | 711/158 |
| 2017/0193003 A1* | 7/2017 | Vijayan | ................. G06F 3/0683 |

(Continued)

*Primary Examiner* — Anh Nguyen
(74) *Attorney, Agent, or Firm* — NDWE, LLP (57) ABSTRACT

The disclosed embodiments provide a system for managing a stream-processing application. During operation, the system allocates a first host for an active instance of the stream-processing application that maintains a state during processing of one or more input streams. Next, the system allocates a second host for a first backup instance that recreates the state on the active instance by consuming changes to the state replicated from the active instance without consuming the input stream(s). During a failure on the first host, the system moves the active instance to the first host by stopping the first backup instance on the second host. Finally, the system launches the active instance on the second host to resume processing of the input stream(s) by the active instance using the recreated state from the first backup instance.

18 Claims, 5 Drawing Sheets

(56) References Cited

U.S. PATENT DOCUMENTS

| | | | |
|---|---|---|---|
| 2017/0235645 A1* | 8/2017 | Theimer | G06F 11/2094 |
| | | | 707/634 |
| 2018/0218522 A1* | 8/2018 | de Castro Alves | ........................ |
| | | | G06F 16/9024 |
| 2018/0260125 A1* | 9/2018 | Botes | G06F 3/067 |
| 2019/0102266 A1* | 4/2019 | Park | G06F 11/1658 |

* cited by examiner

STATE REPLICATION, ALLOCATION AND FAILOVER IN STREAM PROCESSING

BACKGROUND

Field

The disclosed embodiments relate to stream-processing systems. More specifically, the disclosed embodiments relate to techniques for providing allocation and failover for state replication in stream-processing systems.

Related Art

Analytics allows trends, patterns, relationships, and/or other attributes related to large sets of complex, interconnected, and/or multidimensional data to be discovered. In turn, the discovered information can be used to gain insights and/or guide decisions and/or actions related to the data. For example, business analytics may be used to assess past performance, guide business planning, and/or identify actions that may improve future performance.

However, significant increases in the size of data sets have resulted in difficulties associated with collecting, storing, managing, transferring, sharing, analyzing, and/or visualizing the data in a timely manner. For example, conventional software tools and/or storage mechanisms are unable to handle petabytes or exabytes of loosely structured data that is generated on a daily and/or continuous basis from multiple, heterogeneous sources.

Instead, management and processing of "big data" commonly require massively parallel and/or distributed software running on a large number of physical servers. For example, multiple applications, services, nodes, and/or other collections of hardware or software components are distributed across an organization's infrastructure. As events occur within or across the infrastructure, the components generate event streams that track and/or record the events in near-real-time. Such events include, but are not limited to, user activity data, messaging data, telemetry data, video streams, audio streams, networking data, performance data, notification data, diagnostics data, and/or analytics data. A stream-processing system then partitions, aggregates, filters, transforms, windows, and/or joins data in the streams before outputting the results of such processing in new streams in a continuous and/or near-real-time basis.

On the other hand, the distributed nature of stream-processing systems complicates the detection, diagnosis, and/or resolution of errors, issues, or failures. For example, a failure in a host within a stream-processing system is detected by a monitoring system, which alerts administrators to the failure by outputting an error related to the failure. However, conventional monitoring systems typically characterize errors using exceptions and other software-related issues and lack information related to hosts or components experiencing the errors in the stream-processing system. As a result, the administrators are required to manually diagnose the root causes of the errors, which can be time-consuming and exacerbate latency or downtime in the stream-processing system.

Second, stateful stream processing involves maintaining a state that tracks data and/or operations related to multiple events and/or streams. For example, a node in a stream-processing system aggregates click events from an input stream into a count of the number of clicks for each user over an hour. During the aggregation, the node maintains a state that includes counters, which are incremented in response to click events for the corresponding users. When the node experiences a failure, the state is lost and can be restored by "replaying" the node's processing of the same input stream and/or copying the state from a replica of the node in another cluster or data center. In both instances, recovering the node's state incurs significant overhead that extends the downtime of the node. While the node is down, downstream applications or services are unable to use the node's output, which can further disrupt the operation or availability of the downstream applications or services.

Consequently, big data analytics may be facilitated by mechanisms for efficiently and/or effectively monitoring and managing errors and failures in distributed data-processing systems.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for managing a stream-processing system. In these embodiments, the stream-processing system includes multiple distributed nodes that apply filters, transformations, aggregations, joins, windowing, and/or other types of operations to streaming data. For example, the stream-processing system includes an Apache Samza platform that is deployed across a number of hosts, clusters, and/or data centers. Each Samza stream processor in the platform consumes one or more input streams, which can include event streams from a distributed streaming platform such as Apache Kafka (Kafka™ is a registered trademark of the Apache Software Foundation), changes to a database or other data store transmitted over a change data capture (CDC) pipeline, and/or a number of input files in a distributed filesystem. Each stream processor produces one or more output streams from the corresponding input streams, which can further be inputted into additional stream processors for subsequent and/or chained processing of streaming data.

More specifically, the disclosed embodiments provide a method, apparatus, and system for managing state replication, allocation, and failover in the stream-processing system. A resource-management system allocates an active instance of a stream processor and one or more backup instances of the active instance on different hosts and/or according to a priority-based ordering of the active and backup instances. The resource-management system then deploys the active and backup instances on the respective hosts. For example, the resource-management system allocates an active or backup instance on each host as a Samza container and starts the instance as one or more Samza stream processors within the container.

After deployment, the active instance performs normal stream processing that generates one or more output streams from one or more input streams. On the other hand, each backup instance of the active instance consumes events and/or data containing changes to the state on the active instance so that the state is replicated and/or recreated on the host containing the backup instance. For example, the active instance emits changes to its state to a Kafka event stream, and each backup instance recreates the state by consuming records from the Kafka event stream instead of consuming and/or processing the same input streams as the active instance.

When an unrecoverable failure (e.g., a failure due to disk, network, or other hardware faults) occurs on a first host on which the active instance is deployed, the resource-management system selects a second host containing a backup instance as a target in performing a failover of the active instance. Next, the resource-management system stops the backup instance on the second host and launches the active instance on the second host. The active instance then resumes processing of the corresponding input streams using the recreated state maintained by the backup instance that was previously on the same host.

After a backup instance is replaced with an active instance and/or experiences a failure, the resource-management system allocates a new host for the backup instance. The resource-management system then starts the backup instance on the new host, and the backup instance proceeds to recreate the state on the corresponding active instance by consuming changes to the active instance's state.

By deploying and executing backup instances that recreate the state of an active instance of the stream-processing application without consuming the same input data as the active instance, the disclosed embodiments reduce the use of host resources and/or streaming infrastructure by the backup instances while maintaining a substantially up-to-date representation of the state in the backup instances. In turn, restoring the active instance on a host that previously contained a backup instance of the active instance allows the active instance to resume stream processing using the state recreated by the backup instance, which reduces downtime in the stream-processing application. Moreover, allocation of the active and backup instances to different hosts and/or according to deterministic priorities or orderings of the instances ensures that a failure in one instance does not result in a corresponding failure or outage in another related instance. Consequently, the disclosed embodiments provide technological improvements in applications, tools, computer systems, and/or environments for monitoring, executing, managing, and/or performing failover in stream-processing systems.

Allocation and Failover for Stream Processing State Replication

Figure 1:
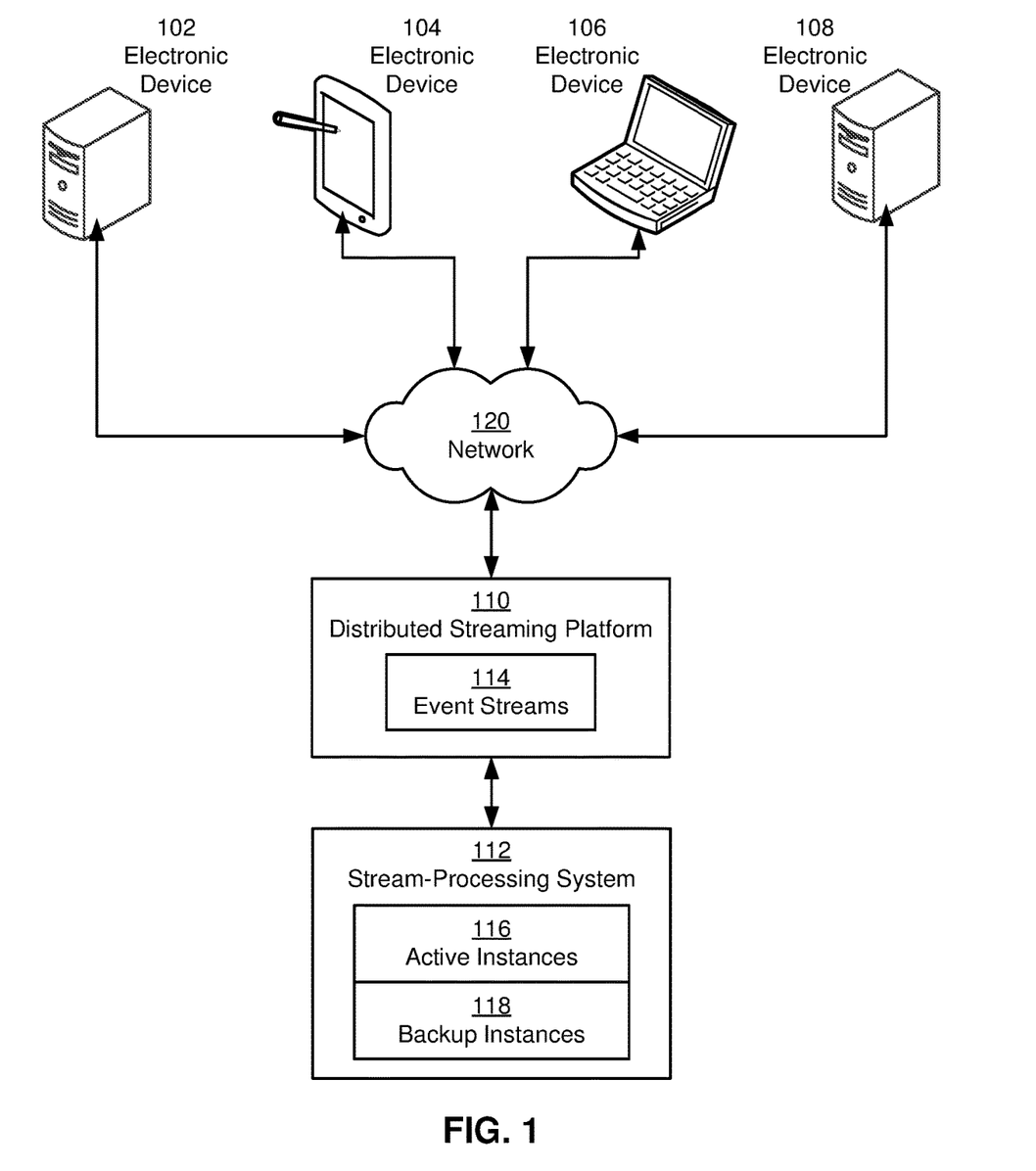
FIG. 1 shows a schematic of a system in accordance with the disclosed embodiments.

FIG. 1 shows a schematic of a system in accordance with the disclosed embodiments. As shown in FIG. 1, a number of event streams 114 are generated and/or transmitted over a distributed streaming platform 110 based on clicks, views, searches, purchases, sessions, application invocations, and/or other activity on a set of electronic devices 102-108 connected to a network 120. Electronic devices 102-108 include, but are not limited to, personal computers (PCs), laptop computers, tablet computers, mobile phones, portable media players, workstations, servers, gaming consoles, smart home devices, sensor devices, and/or other network-enabled computing or electronic devices. Network 120 includes, but is not limited to, a local area network (LAN), wide area network (WAN), personal area network (PAN), virtual private network, intranet, cellular network, Wi-Fi network (Wi-Fi® is a registered trademark of Wi-Fi Alliance), Bluetooth (Bluetooth® is a registered trademark of Bluetooth SIG, Inc.) network, universal serial bus (USB) network, Ethernet network, and/or switch fabric.

In one or more embodiments, distributed streaming platform 110 generates and/or maintains event streams 114 containing records of page views, clicks, searches, page loads, service calls, errors, sensor measurements (e.g., temperature, humidity, vibrations, current, voltage, pressure, acoustics, etc.), anomalies, failures, and/or other activity collected from electronic devices 102-108. Records in event streams 114 also, or instead, include performance metrics related to the activity, such as page load times, download times, function execution times, connection times, latencies, processor load, memory and cache usage, system throughput, queue lengths, quality of service, click-through rates, and/or conversion rates. Records in event streams 114 also, or instead, include dimensions associated with the activities and/or metrics, such as entity IDs, page keys, locations, browser names and/or versions, operating systems, device types, network connection types, protocols, environments, and/or time intervals. Thus, with large numbers of electronic devices 102-108 in a highly distributed system, distributed streaming platform 110 can receive large volumes of records from event streams 114 on a real-time or near-real-time basis.

For example, distributed streaming platform 110 includes an Apache Kafka (Kafka™ is a registered trademark of the Apache Software Foundation) platform that is deployed across a number of hosts, clusters, data centers, and/or other collections of computing resources. When a certain type of activity (e.g., click, request, user session, download, etc.) occurs on an electronic device (e.g., electronic devices 102-108), a publisher in distributed streaming platform 110 generates a record of the activity and publishes the record to one or more event streams 114. Distributed streaming platform 110 then propagates the record to components subscribing to the same event streams(s), such as a stream-processing system 112. Consequently, distributed streaming platform 110 allows activity occurring on multiple nodes of a distributed system (e.g., electronic devices 102-108) to be captured and transmitted in a unified, scalable manner.

In one or more embodiments, stream-processing system 112 includes multiple distributed nodes that apply filters, transformations, aggregations, joins, windowing, and/or other operations to event streams 114 obtained from distributed streaming platform 110 and/or other sources. For example, stream-processing system 112 includes an Apache Samza platform that is deployed across a number of hosts, clusters, and/or data centers. Each stream processor in the Samza platform consumes one or more input streams, which can include Apache Kafka event streams 114, changes to a database or other data store transmitted over a change data capture (CDC) pipeline, and/or a number of input files in a distributed filesystem. Each stream processor also produces one or more output streams from the corresponding input streams, which can further be inputted into additional stream processors for further processing of data in the output stream(s).

In one or more embodiments, stream-processing system 112 includes functionality to perform state replication, allocation, and failover of stream processors and/or other components in a way that minimizes downtime, unavailability, and/or overhead. In particular, stream-processing system 112 includes a number of active instances 116 of the stream processors, as well as a number of backup instances 118 that replicate the state of active instances 116 while consuming fewer host and/or distributed streaming resources as active instances 118. A failure in a first host on which an active instance executes is then remedied by moving the active instance to a second host on which a backup instance of the active instance resides. Because the backup instance has recreated the active instance's state on the second host, the active instance is able to resume processing of one or more event streams 114 on the second host with little to no downtime, as discussed in further detail below.

Figure 2:
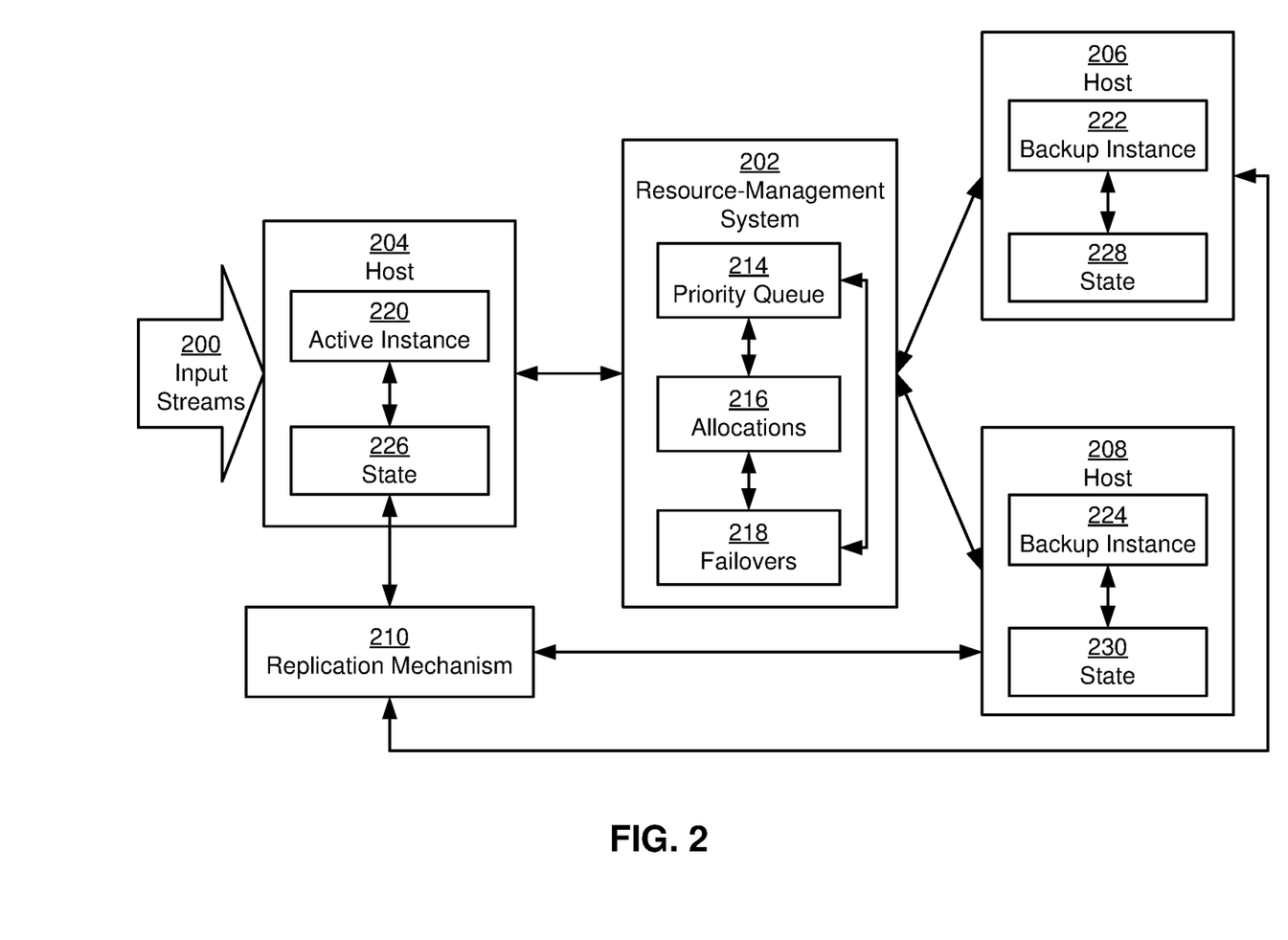
FIG. 2 shows a stream-processing system in accordance with the disclosed embodiments.

FIG. 2 shows a stream-processing system (e.g., stream-processing system 112 of FIG. 1) in accordance with the disclosed embodiments. The stream-processing system includes a number of hosts 204-208 and a resource-management system 202. Each of these components is described in further detail below.

Hosts 204-208 include physical and/or virtual machines that execute instances of a stream-processing application. For example, the stream-processing application includes one or more Samza stream processors that perform filtering, grouping, aggregation, transformation, and/or other operations on records in Kafka input streams 200 and outputs the results of the operations in one or more Kafka output streams and/or databases.

As shown in FIG. 2, host 204 includes an active instance 220 of the stream-processing application, and hosts 206-208 each include backup instances 222-224 of active instance 220. Active instance 220 implements stream-processing functionality that includes processing of input streams 200 based on a state 226. For example, active instance 220 includes one or more Samza containers and/or one or more Samza stream processors executing within each container.

In some embodiments, active instance 220 maintains an in-memory state 226 as a number of key-value pairs and uses state 226 to generate output based on records and/or data in input streams 200. For example, active instance 220 includes functionality to process records of page view events in input streams 200 and output records containing the number of page views for each user per day. As a result, state 226 includes keys representing users and values representing numbers of page views by the users. During processing of a given input record, active instance 220 matches a user identifier (ID) in the record to a corresponding key in state 226 and increments the value to which the key maps in state 226. Active instance 220 then writes the key-value pairs in state 226 to a database or output stream at the end of each one-day window.

Those skilled in the art will appreciate that state 226 may be lost when host 204 or active instance 220 experiences a failure or outage. In turn, restoration of state 226 may require processing of all records in the current window by a new and/or restarted active instance 220, during which active instance 220 is unavailable to process the most recent records in input streams 200.

In one or more embodiments, the system of FIG. 2 includes functionality to reduce downtime associated with outages or failures in active instance 220 or host 204 by recreating state 226 in backup instances 222-224 on different hosts 206-208. A replication mechanism 210 propagates changes to state 226 from active instance 220 on host 204 to backup instances 222-224 on other hosts 206-208. Backup instance 222 consumes the changes received over replication mechanism 210 to recreate state 226 as a local state 228 on host 206, and backup instance 224 consumes the changes received over replication mechanism 210 to recreate state 226 as a local state 230 on host 208. Neither backup instance consumes and/or processes input streams 200 to update the corresponding local state. Consequently, backup instances 222-224 improve redundancy in the system without incurring as much overhead as active instance 220.

Those skilled in the art will appreciate that replication mechanism 210 and backup instances 222-224 may be implemented in a number of ways. For example, replication mechanism 210 includes one or more Kafka event streams to which changes in state 226 are published. Backup instances 222-224 include Kafka consumers, Samza containers, and/or stream processors that subscribe to the Kafka event stream(s) and write changes in state 226 received over the Kafka event stream(s) to their corresponding states 228-230.

In another example, replication mechanism 210 includes a client-server interface or connection between active instance 220 and backup instances 222-224. As a result, backup instances 222-224 include applications that receive changes in state 226 over the interface or connection and apply the changes to local states 228-230 that replicate state 226.

In a third example, replication mechanism 210 includes peer-to-peer synchronization between memory and/or storage on host 204 in which state 226 is stored and memory and/or storage on hosts 206-208 in which states 228-230 are stored. Backup instances 222-224 thus include components that execute on hosts 206-208 and coordinate with a corresponding component on host 204 to synchronize state 226 with states 228-230.

In one or more embodiments, resource-management system 202 improves the reliability and/or availability of the stream-processing application by managing allocations 216 and/or failovers 218 related to active instance 220 and backup instances 222-224 on hosts 204-208. For example, resource-management system 202 utilizes a cluster-management system such as a Yet Another Resource Negotiator (YARN) system that is deployed in each cluster on which the stream-processing application executes. The YARN system includes a resource manager, which arbitrates use of hosts 204-208 and/or other resources among other components of the stream-processing system. The YARN system also includes a node manager on each host that coordinates with resource manager 202 to deploy and/or execute one or more instances (e.g., active instance 220 and/or backup instances 222-224) of a stream processor or other component on the host. The YARN system further includes an application master for the stream-processing application that negotiates use of resources from resource manager 202, manages the workload of each instance of the application, and/or handles failures in instances of the application.

First, resource-management system 202 performs allocations 216 of hosts 204-208 to active instance 220 and backup instances 222-224. For example, resource-management system 202 uses the YARN system and/or another cluster-management system to identify one or more healthy hosts 204-208 on which the allocation can be conducted.

Resource-management system 202 additionally performs allocations 216 of hosts 204-208 to instances of the stream-processing application according to a number of constraints. The constraints include a first constraint that requires allocating different physical hosts to each active instance 220 and backup instances 222-224 of the active instance. For example, the constraints require allocation of three different hosts 204-208 to one active instance 220 and two backup instances 222-224 of active instance 220, respectively. As a result, a failure of one host and/or instance is less likely to affect the operation of the other hosts and/or instances than if two or more instances from active instance 220 and the corresponding backup instances 222-224 were assigned to the same host.

The constraints also, or instead, include a second constraint that requires allocating all active instances of the stream-processing application before all backup instances of the stream-processing application. This constraint ensures that resources in the cluster are prioritized for actual processing of input streams 200 while allowing resources that remain after the stream-processing application is fully deployed in the cluster to be used in improving the redundancy and/or fault tolerance of the stream-processing application.

In one or more embodiments, resource-management system 202 uses a priority queue 214 that orders active instance 220 and backup instances 222-224 based on associated priorities to perform allocations 216. For example, priority queue 214 orders all active instances of the stream-processing application higher than all backup instances of the stream-processing application (e.g., active instances A, B, and C are ordered before and have higher priority than backup instances A', B', and C'). Priority queue 214 further generates a deterministic ordering of a set of backup instances for a given active instance (e.g., backup instance A' is ordered before and has higher priority than backup instance A" for the same active instance A). Conversely, priority queue 214 does not enforce priority or ordering among different active instances and/or among backup instances for different active instances.

Because priority queue 214 ensures that all active instances have higher priority than all backup instances, allocations 216 of hosts (e.g., hosts 204-208) to instances according to the ordering of the instances in priority queue 214 allow resource-management system 202 to enforce the second constraint. For example, resource-management system 202 initially uses priority queue 214 to assign various instances of the stream-processing application to hosts in a given cluster, so that all active instances are assigned first and all backup instances are subsequently assigned based on remaining host resources. Priority queue 214 additionally helps ensure that active instances are uniformly distribute across hosts in the cluster, and that backup instances are also uniformly distributed across hosts in the cluster (independent of the active instances). When a given host or instance experiences an outage or a failure, resource-management system 202 further uses priority queue 214 to coordinate failovers 218 and/or additional allocations 216 to manage the outage or failure, as discussed in further detail below.

Resource-management system 202 further enforces the first constraint during allocations 216 of hosts to instances in priority queue 214. For example, resource-management system 202 selects a first host (e.g., host 204) for a given active instance 220 in priority queue 214 before selecting a second, different host (e.g., host 206) for a first backup instance 222 of active instance 220, which deterministically appears after active instance 220 in priority queue 214. Resource-management system 202 then selects, for a second backup instance 224 of active instance 220, a third host (e.g., host 208) that is different from the first two hosts selected for active instance 220 and the first backup instance 222. If resource-management system 202 is unable to allocate three different hosts to the three instances, resource-management system 202 reassigns hosts to instances of the stream-processing application until the three instances are able to reside on three different hosts. Resource-management system 202 also, or instead, omits allocation of a host to one of the backup instances. Resource-management system 202 also, or instead, configures a backup instance for another active instance to recreate both state 226 on active instance 220 and the state on the other active instance. In turn, the backup instance can be used to restore either active instance.

Second, resource-management system 202 uses allocations 216 and priority queue 214 to perform failovers 218 during failures related to active instance 220 and backup instances 222-224. When a failure is detected in a given instance, resource-management system 202 initially attempts to reallocate the same host to the failed instance. If the allocation is granted, the instance is restarted on the host, and the failure is remedied. On the other hand, if the allocation is denied, the host is unable to accommodate the instance (e.g., due to a lack of capacity, a failure, and/or an outage on the host).

When the host on which a backup instance is deployed has failed, resource-management system 202 allocates a different host to the backup instance, subject to the constraint that the host does not already contain an active instance with a state that is replicated by the backup instance and/or another backup instance of the active instance. Resource-management system 202 then deploys the backup instance on the host, and the backup instance uses replication mechanism 210 to recreate the state of the corresponding active instance on the host.

When the host on which an active instance (e.g., active instance 220) is deployed has failed, resource-management system 202 moves the active instance to a different host containing a backup instance of the active instance. As illustrated in the example sequence of operations in FIG. 3, an active instance failure 310 on host 204 is detected by resource-management system 202. For example, active instance failure 310 is detected by a YARN node manager and/or application master in resource-management system 202.

Figure 3:
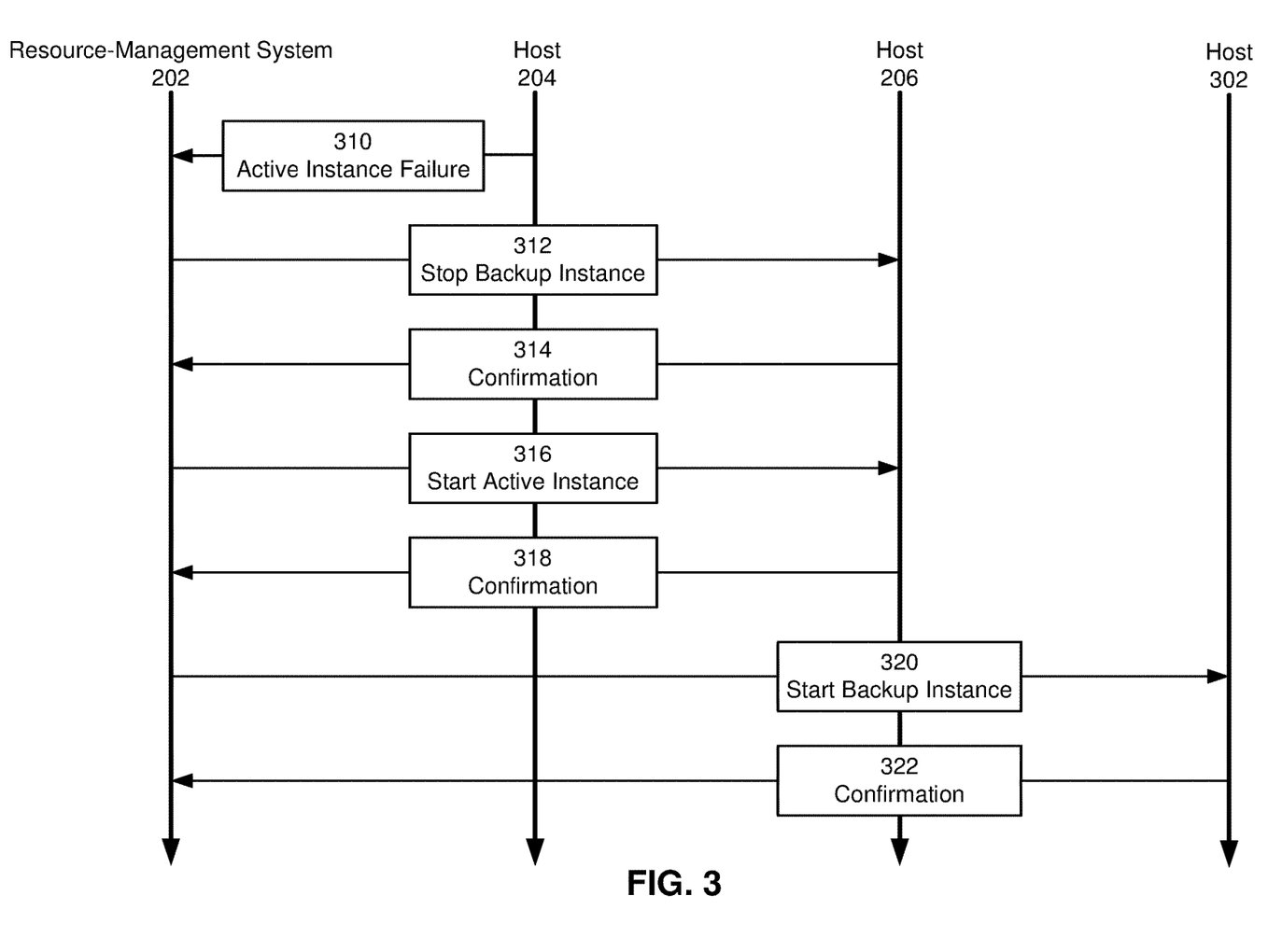
FIG. 3 shows an example sequence of operations involved in performing a failover of an active instance of a stream-processing application in accordance with the disclosed embodiments.

In response to active instance failure 310, resource-management system 202 attempts to allocate the same host 204 to the failed active instance 220. The allocation attempt fails because the host is out of capacity or unreachable due to a failure, outage, and/or network issue.

Because active instance 220 cannot be redeployed on the same host 204, resource-management system 202 performs a failover of active instance 220 to host 206, on which backup instance 222 resides. First, resource-management system 202 selects host 206 as the target for the failover. For example, resource-management system 202 retrieves locality mappings of backup instances 222-224 for active instance 220 to the corresponding hosts 206-208 from a coordinator stream for a Samza stream-processing platform. Resource-management system 202 then selects host 206 as the target for failover of active instance 220 because host 206 contains the only available backup instance 222 for active instance 220, state 228 on host 206 has the shortest "lag" from state 226 for active instance 220, and/or using other criteria.

Next, resource-management system 202 issues an action or command to stop 312 backup instance 222 on host 206. Continuing with the above example, resource-management system 202 deletes the locality mapping of backup instance 222 to host 206 from the coordinator stream and then issues an asynchronous call to stop backup instance 222. In response to the call, an instance of resource-management system 202 on host 206 stops execution of backup instance 222 and responds with a confirmation 314 that backup instance 222 has been stopped.

Because active instance 220 has failed on host 204 and the locality mapping for backup instance 222 has been deleted, both active instance 220 and backup instance 222 are added to priority queue 214. In turn, resource-management system 202 performs allocations 216 of new hosts to active instance 220 and backup instance 222 according to the higher priority of active instance 220 and the lower priority of backup instance 222 in priority queue 214.

More specifically, resource-management system 202 allocates host 206 to active instance 220 and issues an action or command to start 316 active instance 220 on host 206, before or after confirmation 314 is received from host 206. Continuing with the above example, resource-management system 202 issues another asynchronous call to move active instance 220 to host 206 and/or allocate host 206 to active instance 220. Resource-management system 202 then confirms that backup instance 222 has been stopped on host 206 and/or that host 206 has been successfully allocated to active instance 220 before making an additional asynchronous call to start active instance 220 on host 206.

Resource-management system 202 then receives a confirmation 318 that active instance 220 has successfully started on host 206. Conversely, if resource-management system 202 fails to receive confirmation 318 and/or active instance 220 fails to start on host 206, resource-management system 202 selects a new host containing a different backup instance of active instance 220 (e.g., host 208 and backup instance 224), stops the selected backup instance, moves active instance 220 to the new host, and starts active instance 220 on the new host. Resource-management system 202 optionally repeats the process until active instance 220 successfully starts on a host on which a backup instance of active instance 220 was deployed.

After host 206 has been allocated to active instance 220, resource-management system 202 performs allocation of a new host 302 to backup instance 222, subject to the constraint that host 302 does not already contain another active instance with a state that is replicated by backup instance 222 and/or another backup instance of active instance 220. Resource-management system 202 then issues an action or command to start 320 backup instance 222 on host 302. Finally, resource-management system 202 receives a confirmation 322 that backup instance 222 has been successfully started on host 302.

Conversely, if resource-management system 202 fails to receive confirmation 322 and/or backup instance 222 fails to start on host 302, resource-management system 202 allocates a new host to backup instance 222 (subject to the same constraint), and attempts to start backup instance 222 on the new host. Resource-management system 202 optionally repeats the process until a new host is successfully allocated to backup instance 222 and backup instance 222 successfully starts on the new host.

By deploying and executing backup instances that recreate the state of an active instance of the stream-processing application without consuming the same input data as the active instance, the system of FIG. 2 reduces the use of host resources and/or streaming infrastructure by the backup instances while maintaining a substantially up-to-date representation of the state in the backup instances. In turn, restoring the active instance on a host that previously contained a backup instance of the active instance allows the active instance to resume stream processing using the state recreated by the backup instance, which reduces downtime in the stream-processing application. Moreover, allocation of the active and backup instances to different hosts and/or according to deterministic priorities or orderings of the instances ensures that a failure in one instance does not result in a corresponding failure or outage in another related instance. Consequently, the disclosed embodiments provide technological improvements in applications, tools, computer systems, and/or environments for monitoring, executing, managing, and/or performing failover in stream-processing systems.

Those skilled in the art will appreciate that the system of FIG. 2 may be implemented in a variety of ways. First, resource-management system 202, active instance 220, backup instances 222-224, replication mechanism 210, and/or hosts 204-208 may be provided by a single physical machine, multiple computer systems, one or more virtual machines, a grid, a cluster, one or more databases, one or more filesystems, and/or a cloud computing system. Various components of resource-management system 202, replication mechanism 210, active instance 220, and/or backup instances 222-224 may be implemented together and/or separately by one or more hardware and/or software components and/or layers.

Second, the number of hosts, active instances, and/or backup instances in the system may be selected to scale with data volume in input streams 200, stream-processing functionality of the stream-processing application, availability of resources, and/or requirements related to the reliability and/or availability of the stream-processing application. For example, resource-management system 202 selects the number of active and/or backup instances deployed on a given host to improve utilization of resources on the host while enforcing constraints associated with allocation of active and backup instances of a given portion of the stream-processing application on different hosts. In another example, the system configures each backup instance to recreate the state for more than one active instance and/or selects the number of backup instances for each active instance to meet requirements related to the availability and/or downtime of the stream-processing application.

Those skilled in the art will also appreciate that the system of FIG. 2 may be adapted to other types of functionality. For example, functionality related to replicating state, allocating resources, and/or managing failover in the system may be used with other types of data-processing platforms or systems. In another example, the failover functionality of the system can be used to move processing from a first host to a second host to allow the first host to be upgraded (e.g., by updating the operating system of the first host, applying security patches, etc.).

Figure 4:
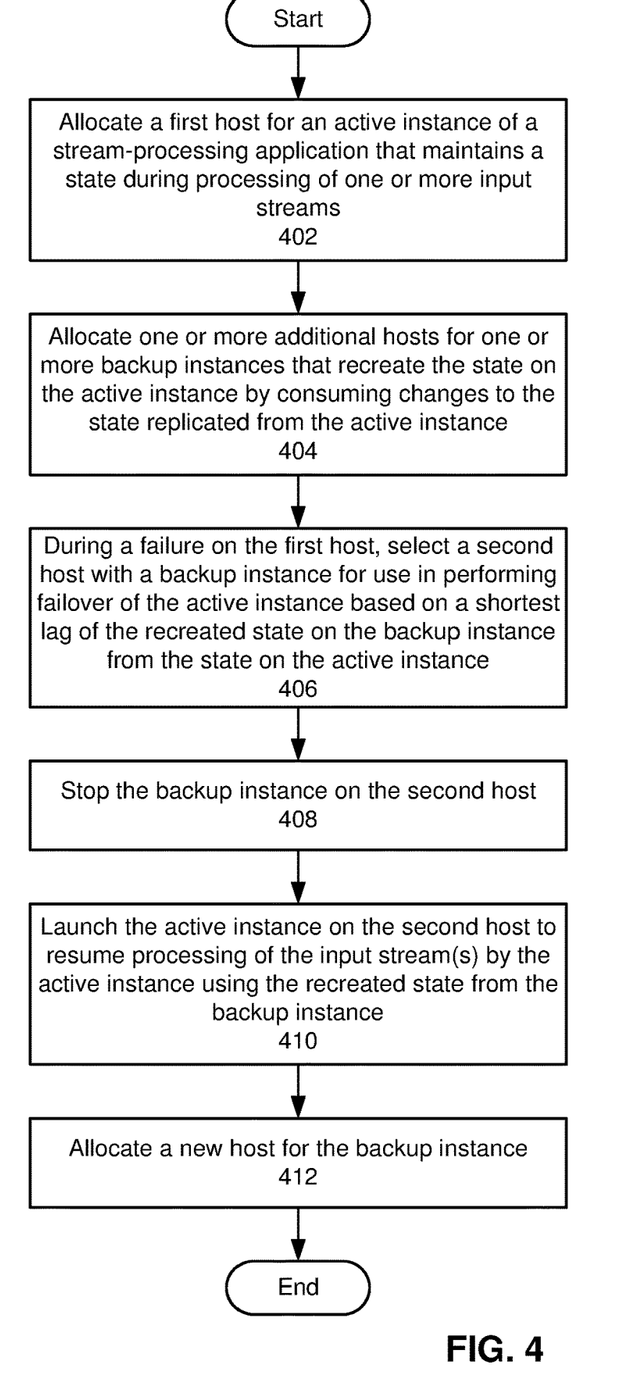
FIG. 4 shows a flowchart illustrating a process of managing a stream-processing application in accordance with the disclosed embodiments.

FIG. 4 shows a flowchart illustrating a process of managing a stream-processing application in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a first host is allocated for an active instance of a stream-processing application that maintains a state during processing of one or more input streams (operation 402). For example, the host is allocated by a YARN resource manager, and the active instance is deployed by a corresponding YARN node manager in the host.

Next, one or more additional hosts are allocated for one or more backup instances that recreate the state on the active instance by consuming changes to the state replicated from the active instance (operation 404). For example, the active and backup instances are allocated according to a priority-based ordering in a priority queue, in which active instances of the stream-processing application have a higher priority than backup instances of the stream-processing application, and multiple backup instances for a given active instance have a deterministic ordering. In another example, the active and backup instances are allocated to different hosts, so that a failure of one instance or host does not affect the availability or execution of other instances.

After hosts are allocated to the active and backup instances, the active instance performs regular processing of records in the input stream(s). For example, the active instance applies joins, aggregations, groupings, windowing, and/or other operations or transformations to the records. During processing of the records, the active instance maintains a state that is used to generate a result and/or output from the processing. For example, the active instance maintains a state that includes a set of keys, along with a set of values to which the keys are mapped. As records from the input stream(s) are received by the active instance, the active instance matches IDs and/or dimensions in the records to the corresponding keys and updates values to which the keys are mapped based on the received records.

On the other hand, each backup instance of the active instance does not consume or process the same input stream(s) as the active instance. Instead, each backup instance uses a replication mechanism to receive changes to the state on the active instance. For example, a backup instance receives the changes over an event stream in a distributed streaming platform, an interface with the active instance, a client-server interaction with the active instance, and/or a synchronization mechanism between memory or storage containing the active instance's state on the first host and memory or storage containing a corresponding state for the backup instance on a different host.

During a failure on the first host, the active instance is moved to a second host on which a backup instance of the active instance is deployed. More specifically, a second host with a backup instance of the active instance is selected for use in performing failover of the active instance based on a shortest lag of the recreated state on the backup instance from the state on the active instance (operation 406). For example, the second host is selected because the backup instance on the second host has read a later offset from a Kafka event stream containing changes to the active instance's state than other backup instances of the active instance.

Next, the backup instance is stopped on the second host (operation 408), and the active instance is launched on the second host to resume processing of the input stream(s) by the active instance using the recreated state from the backup instance (operation 410). For example, the backup instance is stopped, and the second host is allocated to the active instance. The active instance is then moved to the second host and started on the second host.

Once the active instance has started on the second host, the active instance "catches up" to the active instance's latest state on the first host. For example, the active instance obtains the latest change to the active instance's state processed by the backup instance (e.g., the latest offset of the Kafka event stream ready by the backup instance) and updates the state on the second host with one or more changes after the latest change (e.g., one or more events after the latest offset in the event stream). After the active instance's state is fully recreated on the new, second host, the active instance resumes processing (e.g., aggregating, joining, grouping, filtering, transforming, etc.) additional records from the input streams using the up-to-date state.

Finally, a new host is allocated for the backup instance (operation 412). For example, the locality mapping that identifies the backup instance as deployed on the second host is deleted prior to allocating the second host to the active instance. In turn, the backup instance is placed into the priority queue for allocation after the active instance. After the second host is allocated to the active instance, an available host that is not the second host or a host that contains another backup instance of the active instance is selected for the backup instance, and the backup instance is deployed on the selected host.

Figure 5:
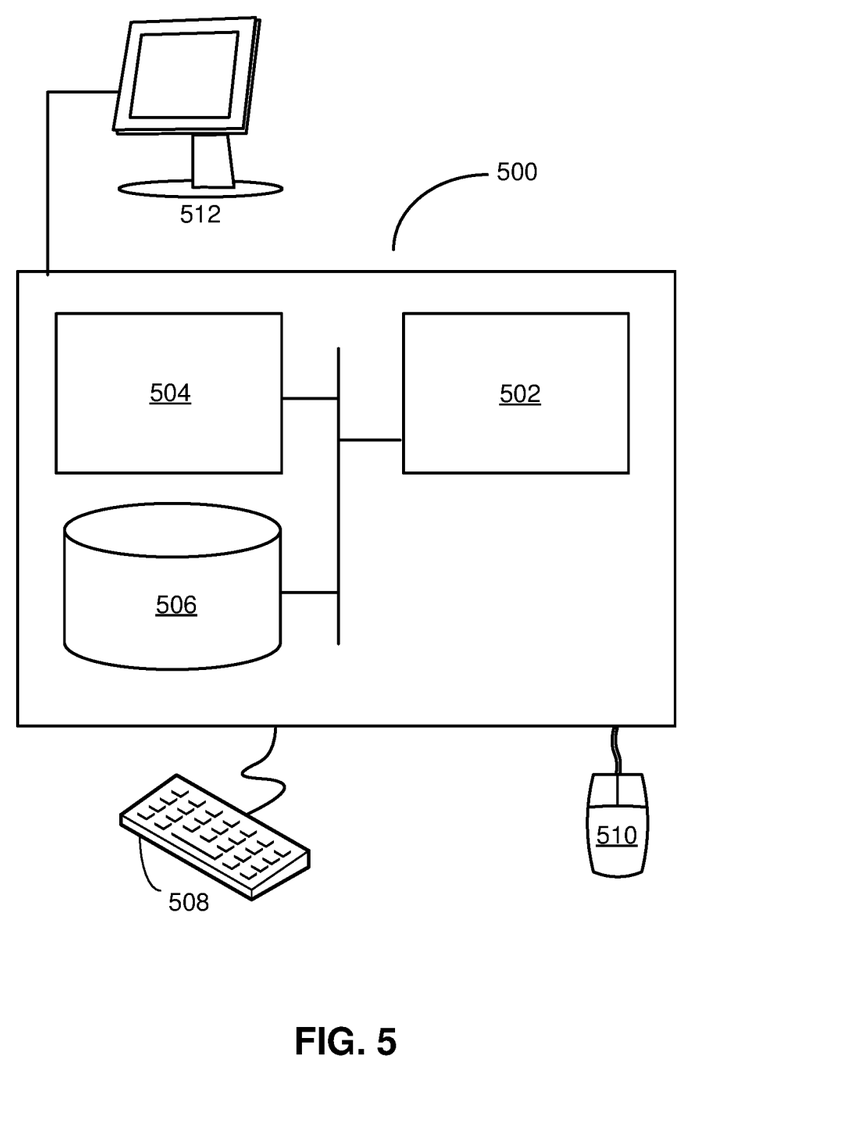
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 includes functionality to execute various components of the present embodiments. In particular, computer system 500 includes an operating system (not shown) that coordinates the use of hardware and software resources on computer system 500, as well as one or more applications that perform specialized tasks for the user. To perform tasks for the user, applications obtain the use of hardware resources on computer system 500 from the operating system, as well as interact with the user through a hardware and/or software framework provided by the operating system.

In one or more embodiments, computer system 500 provides a system for managing a stream-processing application. The system includes a resource-management system and a replication mechanism. The resource-management system allocates a first host for an active instance of the stream-processing application that maintains a state during processing of one or more input streams. The resource-management system also allocates a second host for a backup instance of the active instance. The replication mechanism replicates changes to the state on the active instance to the backup instance, and the backup instance recreates the state on the active instance by consuming changes to the state replicated from the active instance by the replication mechanism without consuming the input stream(s) processed by the active instance. During a failure on the first host, the resource-management system moves the active instance to the first host by stopping the backup instance on the second host. The resource-management system then launches the active instance on the second host to resume processing of the input stream(s) by the active instance using the recreated state from the first backup instance.

In addition, one or more components of computer system 500 may be remotely located and connected to the other components over a network. Portions of the present embodiments (e.g., resource-management system, replication mechanism, active instances, backup instances, hosts, etc.) may also be located on different nodes of a distributed system that implements the embodiments. For example, the present embodiments may be implemented using a cloud computing system that performs allocation, failover, and state replication of remote instances of a distributed stream-processing application.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   allocating, by one or more computer systems, a first host for an active instance of a stream-processing application that maintains a state during processing of one or more input streams while the one or more input streams are being received at the first host;
   replicating changes to the state of the active instance without consuming the one or more input streams;
   allocating, by the one or more computer systems, a second host for a first backup instance that recreates the state on the active instance by consuming the replicated changes to the state of the active instance without consuming the one or more input streams, wherein allocating the first and second hosts comprises:
     allocating the first host to the active instance and the second host to the first backup instance according to a priority-based ordering of the active instance and the first backup instance, wherein the priority-based ordering comprises a high priority for active instances of the stream-processing application, a lower priority for backup instances of the stream-processing application, and a deterministic ordering among multiple backup instances for each of the active instances; and
   during a failure on the first host, moving the active instance to the second host by:
     stopping the first backup instance on the second host; and
     launching the active instance on the second host to resume processing of the one or more input streams by the active instance using the recreated state from the first backup instance.

2. The method of claim 1, further comprising:
   allocating a third host for a second backup instance that recreates the state on the active instance by consuming the changes to the state replicated from the active instance.

3. The method of claim 2, further comprising:
   selecting the second host for use in performing failover of the active instance based on a shortest lag of the recreated state on the first backup instance from the state on the active instance.

4. The method of claim 2, wherein the third host is allocated for the second backup instance in response to at least one of the failure on the first host and another failure on the second host.

5. The method of claim 1, wherein allocating the first and second hosts comprises:
   allocating different hosts to the active instance and the first backup instance.

6. The method of claim 1, wherein consuming changes to the state replicated from the active instance comprises:
   receiving the changes to the state over an event stream in a distributed streaming platform.

7. The method of claim 6, wherein resuming processing of the one or more input streams using the recreated state from the first backup instance comprises:
   obtaining a latest offset of the event stream processed by the first backup instance;
   updating the state with one or more events after the latest offset in the event stream; and processing additional records from the one or more input streams based on the updated state.

8. The method of claim 1, further comprising:
   recreating, by the first backup instance, an additional state on another active instance of the stream-processing application by consuming additional changes to the additional state replicated from the other active instance.

9. The method of claim 1, wherein the state comprises:
   a set of keys; and
   a set of values to which the set of keys is mapped.

10. The method of claim 1, wherein processing of the one or more input streams by the active instance comprises at least one of:
    a join operation;
    an aggregation operation; and
    a grouping operation.

11. A system, comprising:
    one or more processors; and
    memory storing instructions that, when executed by the one or more processors, cause the system to:
      allocate a first host for an active instance of a stream-processing application that maintains a state during processing of one or more input streams while the one or more input streams are being received at the first host;

replicate changes to the state of the active instance without consuming the one or more input streams;

allocate a second host for a first backup instance that recreates the state on the active instance by consuming the replicated changes to the state of the active instance without consuming the one or more input streams, wherein allocating the first and second hosts comprises:

allocating the first host to the active instance and the second host to the first backup instance according to a priority-based ordering of the active instance and the first backup instance, wherein the priority-based ordering comprises a high priority for active instances of the stream-processing application, a lower priority for backup instances of the stream-processing application, and a deterministic ordering among multiple backup instances for each of the active instances; and during a failure on the first host, move the active instance to the second host by:

stopping the first backup instance on the second host; and launching the active instance on the second host to resume processing of the one or more input streams by the active instance using the recreated state from the first backup instance.

12. The system of claim 11, wherein the memory further stores instructions that, when executed by the one or more processors, cause the system to:

allocate a third host for a second backup instance that recreates the state on the active instance by consuming the changes to the state replicated from the active instance.

13. The system of claim 12, wherein the third host is allocated for the second backup instance in response to at least one of the failure on the first host and another failure on the second host.

14. The system of claim 11, wherein allocating the first and second hosts comprises:

allocating the first and second hosts as different hosts to the active instance and the first backup instance.

15. The system of claim 11, wherein resuming processing of the one or more input streams using the recreated state from the first backup instance comprises:

obtaining a latest change to the state on the active instance that was processed by the first backup instance to recreate the state;

updating the recreated state with one or more changes to the state after the latest change; and processing additional records from the one or more input streams based on the updated recreated state.

16. The system of claim 11, wherein the memory further stores instructions that, when executed by the one or more processors, cause the system to:

recreate, by the first backup instance, an additional state on another active instance of the stream-processing application by consuming additional changes to the additional state replicated from the other active instance.

17. The system of claim 11, wherein the state comprises:
a set of keys; and
a set of values to which the set of keys is mapped.

18. A non-transitory computer-readable storage medium storing instructions that when executed by a computer cause the computer to perform a method, the method comprising:

allocating a first host for an active instance of a stream-processing application that maintains a state during processing of one or more input streams;

replicating changes to the state of the active instance without consuming the one or more input streams while the one or more input streams are being received at the first host;

allocating a second host for a first backup instance that recreates the state on the active instance by consuming the replicated changes to the state of the active instance without consuming the one or more input streams, wherein allocating the first and second hosts comprises:

allocating the first host to the active instance and the second host to the first backup instance according to a priority-based ordering of the active instance and the first backup instance, wherein the priority-based ordering comprises a high priority for active instances of the stream-processing application, a lower priority for backup instances of the stream-processing application, and a deterministic ordering among multiple backup instances for each of the active instances; and during a failure on the first host, moving the active instance to the second host by:

stopping the first backup instance on the second host; and launching the active instance on the second host to resume processing of the one or more input streams by the active instance using the recreated state from the first backup instance.

* * * * *